United States Patent
Bixler et al.

(10) Patent No.: US 7,295,214 B2
(45) Date of Patent: Nov. 13, 2007

(54) COLOR MELDING APPARATUS AND METHOD

(75) Inventors: Craig S. Bixler, Saint Charles, IL (US); Ping Li, Naperville, IL (US); David W. Brown, Aurora, IL (US)

(73) Assignee: Edwards Systems Technology, Inc., Chesire, CT (US)

( * ) Notice: Subject to any disclaimer, the term of this patent is extended or adjusted under 35 U.S.C. 154(b) by 350 days.

(21) Appl. No.: 10/995,197

(22) Filed: Nov. 24, 2004

(65) Prior Publication Data

US 2006/0109278 A1    May 25, 2006

(51) Int. Cl.
*G09G 5/02* (2006.01)
(52) U.S. Cl. .............. 345/592; 345/428; 345/591; 345/594; 345/595; 345/606; 715/763
(58) Field of Classification Search .......... 345/594, 345/595; 715/528
See application file for complete search history.

(56) References Cited

U.S. PATENT DOCUMENTS

| | | | | |
|---|---|---|---|---|
| 5,677,644 A | * | 10/1997 | Silverbrook et al. | 327/131 |
| 6,177,923 B1 | * | 1/2001 | Arenson et al. | 345/589 |
| 6,226,010 B1 | * | 5/2001 | Long | 345/594 |
| 6,879,327 B1 | * | 4/2005 | Mathur et al. | 345/589 |

* cited by examiner

*Primary Examiner*—Kee M. Tung
*Assistant Examiner*—Antonio A Caschera
(74) *Attorney, Agent, or Firm*—Baker & Hostetler LLP

(57) ABSTRACT

Techniques for locating an array of melded colors onto a software application's component window in order to create three-dimensional and multicolor graphics within the component window. The techniques include decoding a first and second color into their respective individual color components, performing a transition operation on the foregoing color components to determine transition colors, dividing a portion of the component window into subcomponents, and locating the transition colors into the subcomponents and, thereby, create three-dimensional and multicolor graphics within the component window.

12 Claims, 3 Drawing Sheets

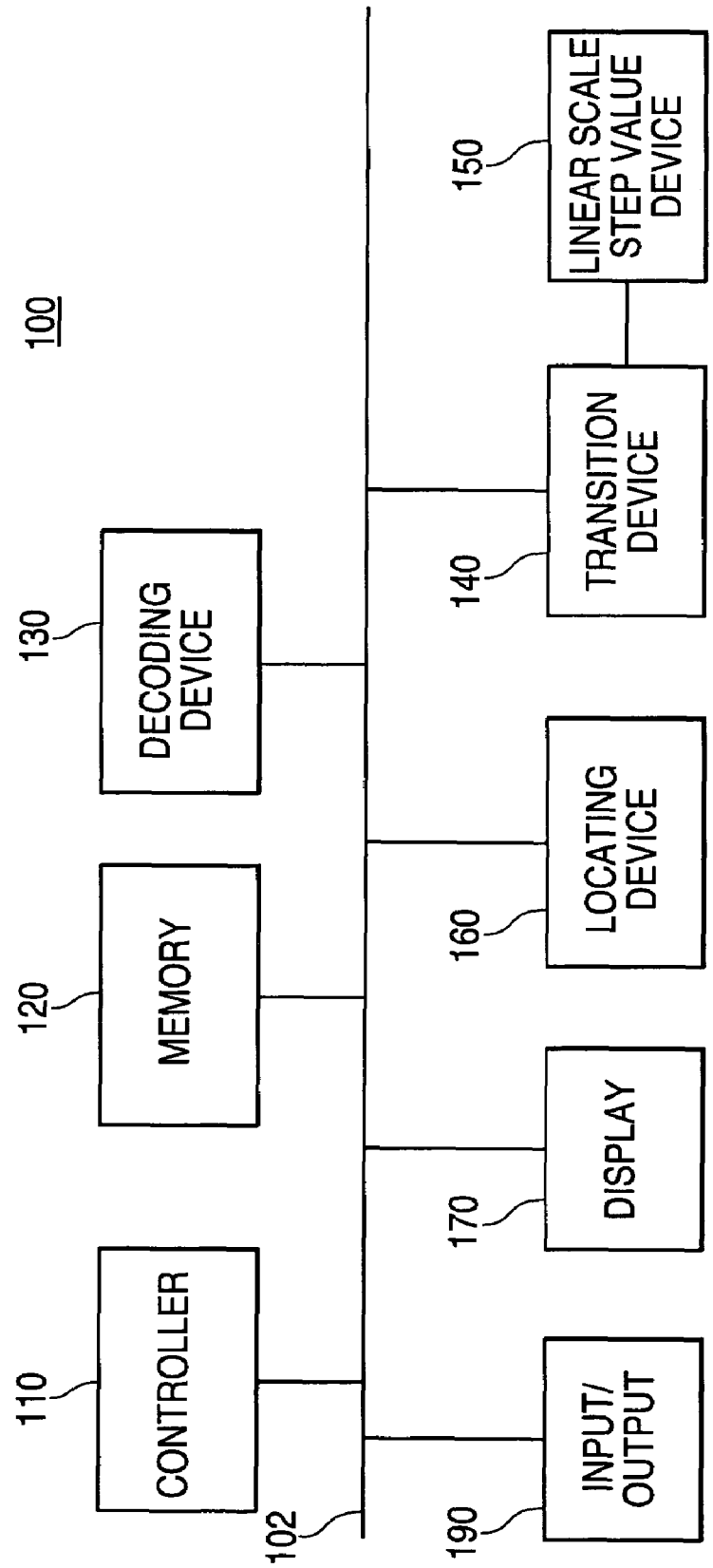

FIG. 2

| | Patient Name | Room | Dietary | Primary Staff | Device # | Meds | Secondary Staff |
|---|---|---|---|---|---|---|---|
| 1 | August, Avril | 1104A | | Johnson, Betty | 101 | | |
| 2 | Baker, Bartholomew | 1105B | | Johnson, Betty | 101 | | |
| 3 | Cain, Charlie | 1106A | | Johnson, Betty | 101 | | |
| 4 | Davidson, Dawna | 1106B | | Hart, Harold | 109 | | |
| 5 | Ernst, Emily | 1106C | | Tucker, Tammi | 113 | | |
| 6 | Franklin, Fiona | 1107B | | Tucker, Tammi | 113 | | |
| 7 | Grant, George | 1107B | | Hart, Harold | 109 | | |
| 8 | Hathaway, Henry | 1108A | | Hart, Harold | 109 | | |
| 9 | Ichabod, Iris | 1109A | | Tucker, Tammi | 113 | | |
| 10 | Jones, Jeremiah | 1110A | | | | | |
| 11 | Keitel, Kelly | 1111A | | Johnson, Betty | 101 | | |
| 12 | Lane, Laura | 1112A | | Hart, Harold | 109 | | |
| 13 | Meite, Martin | 1113A | | Tucker, Tammi | 113 | | |
| 14 | Nischke, Nora | 1114A | | Tucker, Tammi | 113 | | |
| 15 | Ontiveres, Oprah | 1114B | | Johnson, Betty | 101 | | |
| 16 | Patel, Paula | 1115A | | Johnson, Betty | 101 | | |
| 17 | | 1115B | | | | | |
| 18 | | 1116A | | | | | |
| 19 | Sing, Sarah | 1104B | | Hart, Harold | 109 | | |
| 20 | | 1105A | | Hart, Harold | 109 | | |
| 21 | Thompson, Timothy | 1120A | | | | | |
| 22 | 22 | 1124A | | | | | |

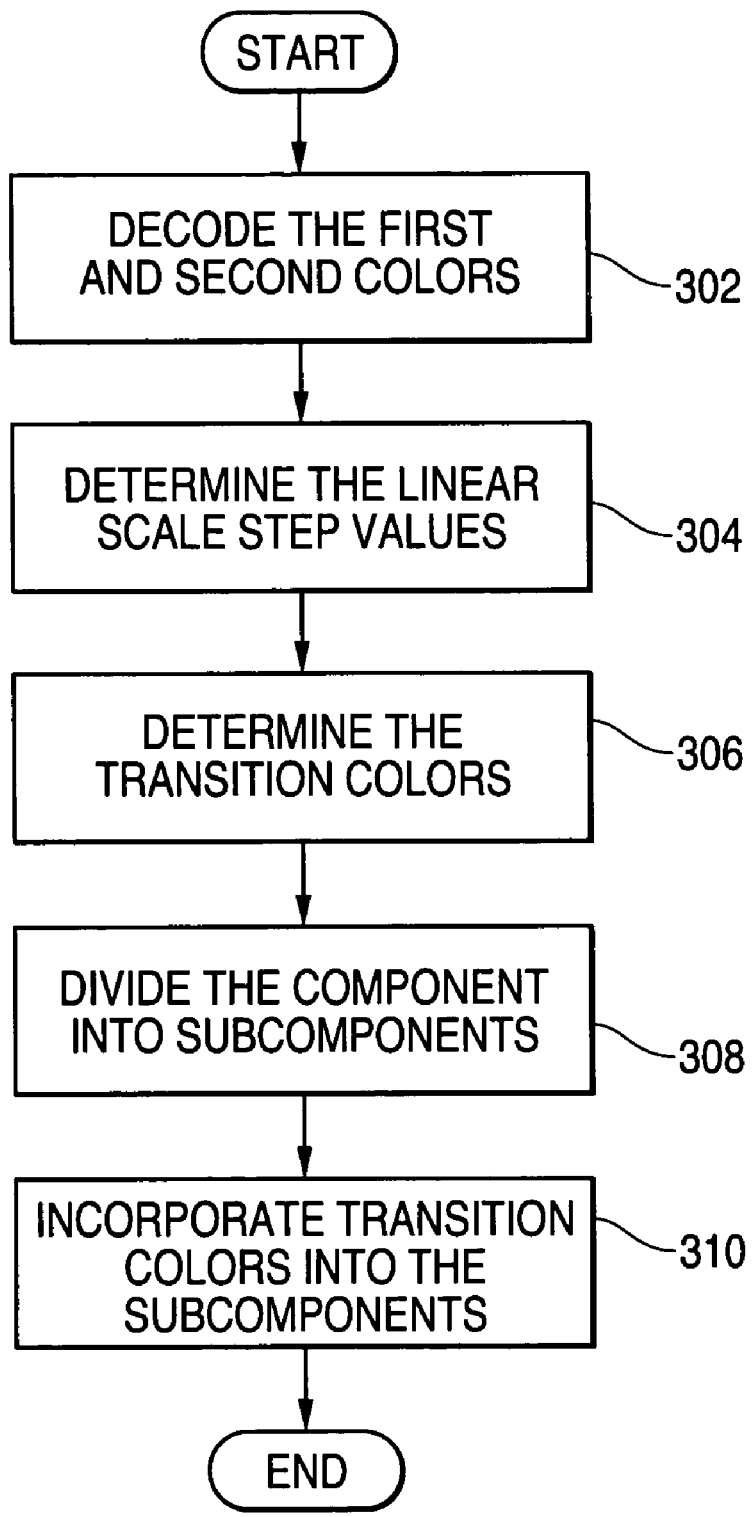

COLOR MELDING APPARATUS AND METHOD

FIELD OF THE INVENTION

The present invention relates generally to the field of graphical interfacing. More particularly, the present invention relates to an apparatus and method for progressively transitioning a graphical user interface from a first color to a second color.

BACKGROUND OF THE INVENTION

Many software applications today offer a single variable background color that can be set upon execution of the application. For example, the software application includes a color palette from which the user can select a single color. The application then applies the user-selected color to the software application's component window. The graphical style created by these single variable color applications may not be responsive to the needs of users looking to create a unique graphical style for their software.

Unique graphical styles are effective marketing tools for software applications. Visibly different and aesthetically pleasing software applications standout and enable users to distinguish among different software applications. Also, unique graphics, such as multicolor and three-dimensional graphics, enable software designers to direct the user's eyes to specific locations and, thus, control where the user focuses his attention. Software applications implementing the foregoing techniques may be easier to use and understand than software applications that offer only generic graphics.

Oftentimes, software designers use identifiable colors to direct the user's eyes to specific locations. However, using only identifiable colors may not direct color deficient users to specific locations because they may unable to identify certain colors. However, color deficient viewers may be able to identify color contrasts created by multicolor transitioning. Software designers may direct color deficient users to a specific location by using the foregoing graphical techniques, thus, make software applications easier to understand and use.

Accordingly, it is desirable to provide a new apparatus and method for progressively transitioning the color of a selected portion of a software application's component window from a first color to a second color in order to create aesthetic multicolor shading and brightening and to create three-dimensional graphics within the component window. Using this apparatus and method, software designers can offer a graphical style, for example, that includes a first and second color, and a progressive array of colors melded between the first and second colors, rather than simply providing a flat color.

SUMMARY OF THE INVENTION

The foregoing needs are met, to a great extent, by the present invention, wherein an apparatus and method for progressively transitioning the color of a portion of a software application's component window, such as a graphical user interface, from a first color to a second color, wherein an array of intermediate colors are melded between the first and second colors. Using the foregoing apparatus and method, multicolor and three-dimensional graphics can be provided within the component window, rather than simply providing a monochromatic and two-dimensional background.

In accordance with one embodiment of the present invention, a method is provided for creating a color meld in a component window of a software application including determining a first color component value based on a first color, determining a second color component value based on a second color, and determining a transition value based on the first and second color component values.

In accordance with another embodiment of the present invention, an apparatus is provided for creating a color meld in a component window of a software application including a decoding device configured to determine a first color component value based on a first color and determining a second color component value based on a second color and a transition device configured to determine a transition value based on the first and second color component values.

In accordance with yet another embodiment of the present invention, an apparatus is provided for creating a color meld in a component window of a software application including means for decoding that determines a first color component value based on a first color and determining a second color component value based on a second color and means for transitioning that determines a transition value based on the first and second color component values.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a block diagram of an apparatus capable of producing multicolor and three-dimensional graphics within a software application's component window.

FIG. 2 depicts an exemplary component window having multicolor and three-dimensional graphics produced therein.

FIG. 3 is a flowchart outlining an exemplary operation providing multicolor and three-dimensional graphics within a software application's component window.

DETAILED DESCRIPTION

The invention will now be described with reference to the drawing figures, in which like reference numerals refer to like parts throughout. The foregoing needs are met, to a great extent, by the present invention, wherein an apparatus and method for progressively transitioning the color of a software application's component window from a first color to a second color is provided. The apparatus and method, for example, melds an array of progressive intermediate colors between a first and a second color located in the component window and, thus, provide multicolor and three-dimensional graphics within the component window, rather than simply providing a monochromatic and two-dimensional background. By adding multicolor and three-dimensional graphics, a unique graphical style can be created for the software.

FIG. 1 is an exemplary color melding device 100 according to the disclosed apparatus and method. As shown in FIG. 1, the exemplary color melding device 100 includes a controller 110, a memory 120, a decoding device 130, a transition device 140, a linear scale step value device 150, a locating device 160, a display 170, and an input/output device 190. The above components 110-190 are coupled together by control/data bus 102.

Although the exemplary color melding device 100 of FIG. 1 uses a bused architecture, it should be appreciated that any other architecture may be used that is well known to those of ordinary skill in the art.

It should be appreciated that some of the above-listed components can take the form of software/firmware routines residing in memory, such as memory element 120. Further, it should be appreciated that the foregoing routines are capable of being executed by the controller 110. It should be understood that the functions of any or all of components 130-160 can be accomplished using object-oriented software, thus increasing portability, software stability, and a host of other advantages not available with non-object-oriented software.

In operation, an operator using the color melding device 100 can display multicolor and three-dimensional graphics into a software application's component window upon execution. For example, an operator can create multicolor and three-dimensional graphics by progressively transitioning the color of a portion of a software application's component window from a first color to a second color, wherein an array of intermediate colors are melded between the first and second colors. Accordingly, such an operator can first access the controller 110, by way of the input/output device 190, where he may select a first and second color. The user may also select a number of color iterations to be applied to the color meld. The number of iterations, for example, may be the number of progressive color steps located into the component window between the first and second colors.

Each progressive color step diverges an incremental amount from the first color and converges an incremental amount toward the second color. A large number of iterations between the first and second colors results in small progressive color steps, and small progressive color steps will result in a smooth transition from the first color to the second color.

It should be appreciated that the particular tools and techniques used to select the first color, second color, and the number of iterations can vary from embodiment to embodiment as required or otherwise desired. Further, it should be appreciated that the color melding device 100 can import a first and second color via the input/output device 190, instead of creating a first and second color.

FIG. 2 depicts an exemplary graphical user interface 202 of a software application having progressive color transitioning 208, 210 applied thereto in order to aid in the understanding of the disclosed apparatus and method. The color melding device 100 creates the progressive color transitioning 208, 210 by melding an array of intermediate colors between a first and second color. FIG. 2 shows two portions of the component window 202 having progressive color transitioning 208, 210 displayed therein, however, it should be appreciated that other portions of the component window 202 can have progressive color transitioning located therein.

Returning to FIG. 1, after the controller 110 has provided a first and second color, the color melding device 100 accesses the decoding device 130, where it decodes the first and second colors. In the exemplary device 100, the decoding device 130 determines the respective red, green, and blue component values ("the RGB values") of the first and second colors. The RGB values, in the exemplary embodiment, include a hexadecimal number combination of 8-bit red, 8-bit green, and 8-bit blue.

It should be appreciated that the particular tools and techniques used to decode the first and second colors can vary from embodiment to embodiment as required or otherwise desired. Further, it should be appreciated that, instead of determining the RGB values, the color melding device 100 can optionally import the RGB values via the input/output device 190. It should also be appreciated that the color melding device 100 may be applied to colors having components other than 24-bit RGB colors.

Once the decoding device 130 has determined the respective values of the first and second colors' individual color components, the color melding device 100 then accesses the transition device 140. The transition device 140 includes the linear scale step value device 150. The linear scale step value device 150 utilizes the values of the first and second colors' individual color components, as determined by the decoding device 130, to determine a linear scale step value for each of the respective color components. The linear scale step value is also referred to as the transition value. The transition device 140 adds or subtracts multiples of the linear scale step values to and from the respective values of the first color's individual color components to determine the array of progressive colors that are to be melded in the component window.

To calculate the linear scale step values, for example, the linear scale step value device 150 determines the difference between the respective color component values of the first and second colors, and then divides each of the foregoing differences by the total number of subcomponents, where the number of subcomponents equals the number of iterations. An example linear scale step value operation is outlined below:

//------------------------------------------------------------//
Red Step Value = (Second Red Component − First Red Component)/ Total Number of Subcomponents
Green Step Value = (Second Green Component − First Green Component)/Total Number of Subcomponents
Blue Step Value = (Second Blue Component − First Blue Component)/ Total Number of Subcomponents
//------------------------------------------------------------//

The linear scale step values are inversely proportional to the total number of subcomponents and, thus, a large number subcomponents results in small linear scale step values. On the other hand, a small total number of subcomponents results in less small and more large linear scale step values. Small linear scale step values create subtle color deviations among subcomponents, which create smooth color transitioning effects.

In the exemplary embodiment, the linear scale step value device 150 can assign, for example, a total number of subcomponents, n. Because the linear scale step values are inversely proportional to n, it is desirable that n is large enough to produce a small linear scale step values and, thus, produce color melds having small color deviations among the subcomponents. Further, the width of each individual subcomponent is inversely proportion to the total number of subcomponents, n. The larger the total number of subcomponents, n, the user-selected area is divided into, the smaller the individual subcomponents are and, thus, the color meld has a smoother transition. It should also be appreciated that the operator can designate the total number of subcomponents, n, via the input/output device 190.

The transition device 140 can add a multiple of each color component's respective step value to the first color's corresponding color component value, where the multiple is based on the subcomponent's position, i, relative to the first color. The first color is the baseline color of the transition operation and is located at a position, i=0, such that no step value is added thereto. Further, the first subcomponent is located at a position, i=1, adjacent to the left side of the main portion to be progressively transitioned. The first subcomponent can be assigned a red component equal to the first red component plus one (1) times the red step value, a green component equal to the first green component plus one (1) times the green step value, and a blue component equal to the first blue component plus one (1) times the blue step value. The second subcomponent, which is located at a position, i=2, relative to the left side of the main portion, can be assigned a red component equal to the first red component plus two (2) times the red step value, a green component equal to the first green component plus two (2) times the green step value, and a blue component equal to the first blue component plus two (2) times the blue step value. The foregoing color assignment calculations are continued until the second color is achieved.

More specifically, in the preferred embodiment, the color component values applied to the intermediate subcomponents increase at a constant linear rate relative to their applicable position, i, until the second color is achieved. For example, the color transition can continue until it reaches the subcomponent having a position, i, equal to the total number of subcomponents, n. When i=n, the total step values added to the first color's component values equal the difference between the component values of the first and second colors and, thus, the second color is achieved.

The foregoing progressive color transitions created by the transition device 140 make up the array of colors that are to be melded between the first and second colors. Below is an example of the transition operation:

```
//-----------------------------------------------------------//
i = 0 to n
Transition Red Component = First Red Component + (i * Red Step Value)
Transition Green Component = First Green Component + (i * Green
Step Value)
Transition Blue Component = First Blue Component + (i * Blue
Step Value)
//-----------------------------------------------------------//
```

The transition device 140 can also subtract a multiple of each color component's respective step value from the first color's corresponding color component value, where the multiple is based on the subcomponent's position, i, relative to the first color. The first color is the baseline color of the transition operation and is located at a position, i=0, such that no step value is subtracted therefrom. Further, the first subcomponent is located at a position, i=1, adjacent to the left side of the main portion. The first subcomponent can be assigned a red component equal to the first red component minus one (1) times the red step value, a green component equal to the first green component minus one (1) times the green step value, and a blue component equal to the first blue component minus one (1) times the blue step value. The second subcomponent, which is located at a position, i=2, relative to the left side of the main portion, can be assigned a red component equal to the first red component minus two (2) times the red step value, a green component equal to the first green component minus two (2) times the green step value, and a blue component equal to the first blue component minus two (2) times the blue step value. The foregoing color assignment calculations are continued until the second color is achieved.

More specifically, in the exemplary transition device 140, the color component values applied to the intermediate subcomponents decrease at a constant linear rate relative to their applicable position, i, until the second color is achieved. For example, the color transition can continue until it reaches the subcomponent having a position, i, equal to the total number of subcomponents, n. When i=n, the total step values subtracted from the first color's component values equal the difference between the component values of the first and second colors and, thus, the second color is achieved.

The foregoing color transitions are an example of the array of colors that are to be melded between the first and second colors. Below is an example of the foregoing transition operation:

```
//-----------------------------------------------------------//
i = 0 to n
Red Component = First Red Component – (i * Red Step Value)
Green Component = First Green Component – (i * Green Step Value)
Blue Component = First Blue Component – (i * Blue Step Value)
//-----------------------------------------------------------//
```

Once the transition device 150 has determined the appropriate transition colors, the locating device 160 can divide the applicable portion of the component window into subcomponents. Further, the locating device 160 can locate each respective transition color into its corresponding subcomponent. For example, the user can designate a rectangular portion of the component window to have the progressive color transition performed thereon. Further, the user can configure the color melding device 100 to subdivide the selected rectangular portion into ten subcomponents, such that n=10. Thus, each subcomponent, located within the main rectangular portion, can have a width equal to 1/10th the total width of the main rectangular portion, and each subcomponent will have a height equal to the total height of the main rectangular portion. The locating device 160 can locate the ten rectangular subcomponents, such that they adjacently positioned side-by-side, onto the main rectangular portion. Once the subcomponents are properly positioned, the locating device 160 can locate each respective transition color into its corresponding subcomponent.

For example, the locating device 160 can locate the ten rectangular subcomponents as follows: the left side of the first subcomponent can be positioned adjacent to the left side of the main rectangular portion; the left side of the second subcomponent can be positioned adjacent to the right side of the first subcomponent; the left side of the third subcomponent can be positioned adjacent to the right side of the second subcomponent. The foregoing positioning can continue until the left side of the tenth subcomponent is positioned adjacent to the right side of the ninth subcomponent, and the right side of the tenth subcomponent is positioned adjacent to the right side of the main rectangular portion.

An example locating operation that determines the respective position of the left side of each subcomponent is outlined below:

```
//---------------------------------------------------------------//
i = 0 to n
left side of subcomponent (i) = left side of main portion + (i − 1) * (total width of the main rectangular portion/n)
//---------------------------------------------------------------//
```

FIG. 3 is a flowchart outlining an exemplary operation according to the present disclosure for progressively transitioning the color of a selected portion of a software application's component window from a first color to a second color in order to create aesthetic multicolor shading and brightening and to create three-dimensional graphics within the component window. The process starts at step 302 where the first and second colors are decoded into their respective individual color component values. Next, in step 304, linear scale step values are determined based on the difference between the first and second colors divided by a total number of subcomponents. Then, in step 306 transition colors are determined. In step 308, a portion of the component window to be progressively color transitioned is divided into subcomponents based on the total number of subcomponents. Next, in step 310 the transition colors are located into the subcomponents.

While the various inventive aspects of this disclosure have been generally described with regard to two-dimensional systems, it should be appreciated that the disclosed methods and systems can be applicable for three dimensional analysis. Also while the various inventive aspects of this disclosure have been generally describe with regard to 24-bit RGB colors, it should be appreciated that the disclosed methods and systems can be applicable for colors of varying bits and components.

In various embodiments where the above-described systems and methods are implemented using a programmable device, such as a computer-based system or programmable logic, it should be appreciated that the above-described systems and methods can be implemented using any of the various known or later developed languages, such as "C", "C++", "FORTRAN", "Pascal", "VHDL", and the like.

Accordingly, various storage media, such as magnetic computer disks, optical disks, electronic memories, and the like, can be prepared to direct a device, such as a computer, to implement the above-described systems and methods. Once an appropriate device has access to the information and programs contained on the storage media, the storage media can provide the information and programs to the device, thus enabling the device to perform the above-described systems and methods.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and methods, implement the individual systems and methods, and coordinate the related functions of the individual systems and methods.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for creating a color meld in a component window of a software application, comprising:
   determining a first color component value based on a first color;
   determining a second color component value based on a second color;
   determining transition value based on the first and second color component values, wherein the transition value is determined by dividing a plurality of subcomponents into a numerical difference between the first color component value and the second color component value, wherein the plurality of subcomponents is a number of subcomponents between the first and second color;
   determining a plurality of transition colors based on the transition value;
   locating the plurality of transition colors between the first and second colors; and
   displaying the plurality of transition colors on a display.

2. The method of claim 1, wherein the transition value is applied to the first color component value to determine the plurality of transition colors.

3. The method of claim 1, wherein locating the plurality of transition colors between the first and second colors includes locating a transition color onto each subcomponent.

4. The method of claim 1, wherein the first and second color components each include a red component, a green component, and a blue component.

5. The method of claim 1, wherein determining the first and second color component values comprises:
   calculating a first red component value from a first subset of n-bits of the first color;
   calculating a first green component value from a second subset of n-bits of the first color;
   calculating a first blue component value from a third subset of n-bits of the first color;
   calculating a second red component value from a first subset of n-bits of the second color;
   calculating a second green component value from a second subset of n-bits of the second color; and
   calculating a second blue component value from a third subset of n-bits of the second color.

6. The method of claim 1, wherein determining the first and second color component values includes calculating at least one component value from a first subset n-bits of the first color and calculating at least one component value from a first subset n-bits of the second color.

7. An apparatus for creating a color meld in a component window of a software application, comprising:

a decoding device configured to determine a first color component value based on a first color and determining a second color component value based on a second color;

a transition device configured to determine a transition value based on the first and second color component values, wherein the transition device determines a plurality of transition colors based on the transition value and determines the transition value by dividing a plurality of subcomponents into a numerical difference between the first color component value and the second color component value, wherein the plurality of subcomponents is a number of subcomponents between the first and second color; and a locating device configured to locate the plurality of transition colors between the first and second colors.

8. The apparatus of claim 7, wherein the transition device applies the transition value to the first color component value to determine the plurality of transition colors.

9. The apparatus of claim 7, wherein the locating device locates a transition color into each subcomponent.

10. An apparatus for creating a color meld in a component window of a software application, comprising:

means for decoding that determines a first color component value based on a first color and determining a second color component value based on a second color;

means for transitioning that determines a transition value based on the first and second color component values, wherein the means for transitioning determines a plurality of transition colors based on the transition value and determines the transition value by dividing a plurality of subcomponents into a numerical difference between the first color component value and the second color component value, wherein the plurality of subcomponents is a number of subcomponents between the first and second color; and means for locating configured to locate the plurality of transition colors between the first and second colors.

11. The apparatus of claim 10, wherein the means for transitioning applies the transition value to the first color component value to determine the plurality of transition colors.

12. The apparatus of claim 10, wherein the means for locating locates a transition color into each subcomponent.

* * * * *